(12) United States Patent
Patel

(10) Patent No.: US 11,073,425 B2
(45) Date of Patent: Jul. 27, 2021

(54) SYSTEMS, DEVICES, AND APPARATUS FOR MONITORING TEMPERATURE AT REMOTE LOCATIONS USING INFRARED LIGHT

(71) Applicant: Eaton Intelligent Power Limited, Dublin (IE)

(72) Inventor: Pratik Shirish Patel, Raleigh, NC (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 16/739,757

(22) Filed: Jan. 10, 2020

(65) Prior Publication Data

US 2020/0149969 A1    May 14, 2020

Related U.S. Application Data

(63) Continuation of application No. 15/473,040, filed on Mar. 29, 2017, now Pat. No. 10,539,465.

(51) Int. Cl.
  *G01J 5/02*     (2006.01)
  *G01J 5/00*     (2006.01)
  (Continued)

(52) U.S. Cl.
  CPC ........... *G01J 5/0096* (2013.01); *G01J 5/0821* (2013.01); *G01K 11/32* (2013.01);
  (Continued)

(58) Field of Classification Search
  CPC .................. G01J 6/0096; G01J 5/0831; G01J 2005/0092; G01J 2005/0081; G01K 13/04;
  (Continued)

(56) References Cited

U.S. PATENT DOCUMENTS

| 4,362,057 A | * | 12/1982 | Gottlieb | G01K 11/32 356/44 |
| 6,175,678 B1 | | 1/2001 | Sanghera | G02B 6/06 385/116 |

(Continued)

FOREIGN PATENT DOCUMENTS

| EP | 0424570 A1 | 5/1991 | ............... B61K 9/06 |
| JP | 58092838 A | 6/1983 | .......... G01M 11/334 |

OTHER PUBLICATIONS

Tao, et al., *Infrared Fibers*, Advances in Optics and Photonics, (2015) pp. 379-458.

(Continued)

*Primary Examiner* — Kiho Kim
(74) *Attorney, Agent, or Firm* — Stanek Lemon Crouse & Meeks, P.A.

(57) ABSTRACT

A remote monitoring system can include a plurality of infrared cables, where each of the infrared cables can have a respective first opening at a first end of the cable and a respective second opening at a second end of the infrared cable that is opposite the first end. The infrared cables can be configured to conduct infrared light emitted from a respective one of a plurality of monitored locations into the respective first opening to exit at the respective second opening. An infrared camera including an infrared sensor array can be optically coupled to each of the second openings of the plurality of infrared cables.

18 Claims, 12 Drawing Sheets

(51) Int. Cl.
*H04Q 9/00* (2006.01)
*G01J 5/08* (2006.01)
*G01K 13/04* (2006.01)
*G01K 11/32* (2021.01)
*G01K 13/06* (2006.01)
*G01K 13/10* (2006.01)
*G08C 23/04* (2006.01)
*G01K 11/3206* (2021.01)

(52) U.S. Cl.
CPC .......... *G01K 11/3206* (2013.01); *G01K 13/04* (2013.01); *G01K 13/06* (2013.01); *G01K 13/10* (2013.01); *G08C 23/04* (2013.01); *H04Q 9/00* (2013.01); *G01J 2005/0081* (2013.01); *G01J 2005/0092* (2013.01); *H04Q 2209/30* (2013.01)

(58) Field of Classification Search
CPC ........ G01K 13/10; G01K 11/32; G01K 13/06; H04Q 9/00; H04Q 2209/30; G08C 23/04; G08C 23/32
See application file for complete search history.

(56) References Cited

U.S. PATENT DOCUMENTS

| | | | | |
|---|---|---|---|---|
| 9,188,493 | B2 | 11/2015 | Honda | B22D 11/124 |
| 2001/0005306 | A1 | 6/2001 | Arioka | H02B 13/02 |
| | | | | 361/611 |
| 2002/0157887 | A1 | 10/2002 | Sugawara | G01S 7/481 |
| | | | | 180/169 |
| 2002/0177956 | A1 | 11/2002 | Fermier | B01L 7/00 |
| | | | | 702/19 |
| 2007/0022645 | A1 | 2/2007 | Villarin | G09F 7/04 |
| | | | | 40/600 |
| 2011/0028788 | A1 | 2/2011 | Oral | A61B 1/273 |
| | | | | 600/182 |
| 2013/0306342 | A1 | 11/2013 | Karandikar | H02B 1/565 |
| | | | | 174/50 |
| 2014/0014858 | A1 | 1/2014 | Gattass | G02B 27/10 |
| | | | | 250/495.1 |
| 2015/0192476 | A1* | 7/2015 | Smith | G01K 5/483 |
| | | | | 374/161 |
| 2015/0204732 | A1* | 7/2015 | Honda | B22D 11/124 |
| | | | | 374/161 |

OTHER PUBLICATIONS

Lucas, et al., *The Development of Advanced Optical Fibers for Long-Wave Infrared Transmission*, Fibers, ISSN 2079-6463 (2013) pp. 110-118.

Jim Hayes, *Understanding Wavelengths in Fiber Optics*, The Fiber Optic Association, Inc. Guide to Fiber Optics & Premises Cabling; Jun. 6, 2016, pp. 1-3.

*Polymicro Technologies MediSpec Hollow Silica Waveguide with Aiming Beam Technology*, www.molex.com/link/hswaimingbeam.html, (Jun. 2015) 1 page.

FLIR AX8, Marine Thermal Monitoring System; Feb. 29, 2016, 3 pages.

EXERTHERM, Permanent Infrared Hotspot Detection; Mar. 2011, 5 pages.

*The Next Technology Step*, EXERTHERM, 24×7 Thermal Monitoring, Mar. 2011 (2 pages).

*High Performance Infrared Camera for Demanding Real-Time Imaging Applications;* LumaSense Technologies, MIKRON Infrared Temperature Sensors, MC320 Series, (2014) 4 pages.

\* cited by examiner

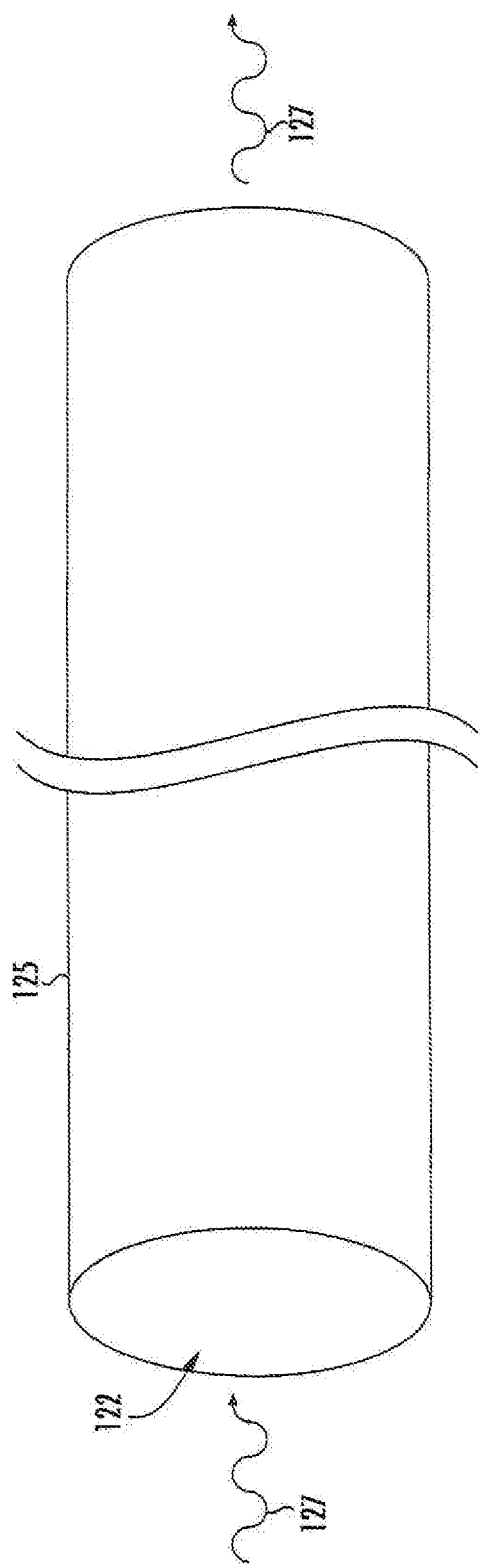
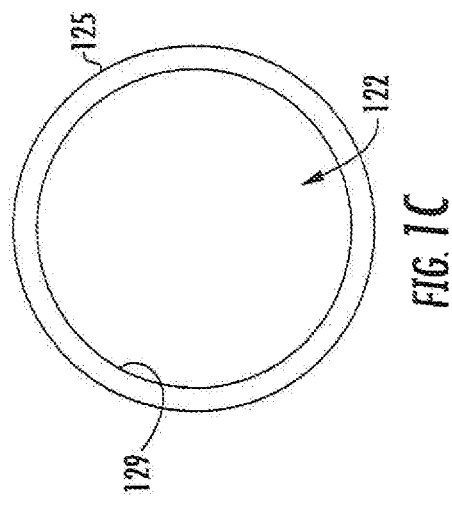
FIG. 1B
FIG. 1C ized herein.

SYSTEMS, DEVICES, AND APPARATUS FOR MONITORING TEMPERATURE AT REMOTE LOCATIONS USING INFRARED LIGHT

RELATED APPLICATIONS

The present application is a continuation of U.S. patent application Ser. No. 15/473,040, entitled "SYSTEMS, DEVICES, AND APPARATUS FOR MONITORING TEMPERATURE AT REMOTE LOCATIONS USING INFRARED LIGHT," filed Mar. 29, 2017, the content of which is hereby incorporated herein by reference in its entirety.

FIELD

The present invention relates to remote monitoring in general and, more particularly, to remote monitoring of temperature.

BACKGROUND

It is known to monitor the temperature of equipment using infrared cameras. For example, it is known to place infrared cameras within enclosures of electrical equipment that is susceptible to overheating. In such approaches, the infrared cameras can generate infrared images showing hot spots associated with the equipment being monitored. The infrared images can be provided to a display used to monitor the temperature of the electrical equipment.

It is also known the use contactless infrared sensors that generate an electrical signal based on a temperature of the monitored location. The electrical signals can be transmitted to outside the electrical equipment where the temperature of the electrical equipment can be monitored using the temperature data displayed on a screen.

SUMMARY

Embodiments according to the invention can provide systems, devices, and apparatus for monitoring of temperature at remote locations using infrared light. Pursuant to these embodiments, a remote monitoring system can include a plurality of infrared cable stubs each have a respective opening, where the respective opening is positioned proximate to a respective one of a plurality of monitored locations, and each respective infrared cable stub being can be configured to conduct infrared light emitted from the respective one of the plurality of monitored locations. An infrared cable can be optically coupled to the plurality of infrared cable stubs, where the infrared cable can be configured to conduct the infrared light from each of the plurality of monitored locations to a location remote from the plurality of monitored locations.

BRIEF DESCRIPTION OF THE DRAWINGS

FIGS. 1B and 1C are schematic views of an infrared cable configured to conduct infrared light from the monitored locations to a remote infrared camera in some embodiments according to the invention.

DETAILED DESCRIPTION OF EMBODIMENTS ACCORDING TO THE INVENTION

Figure 1A:
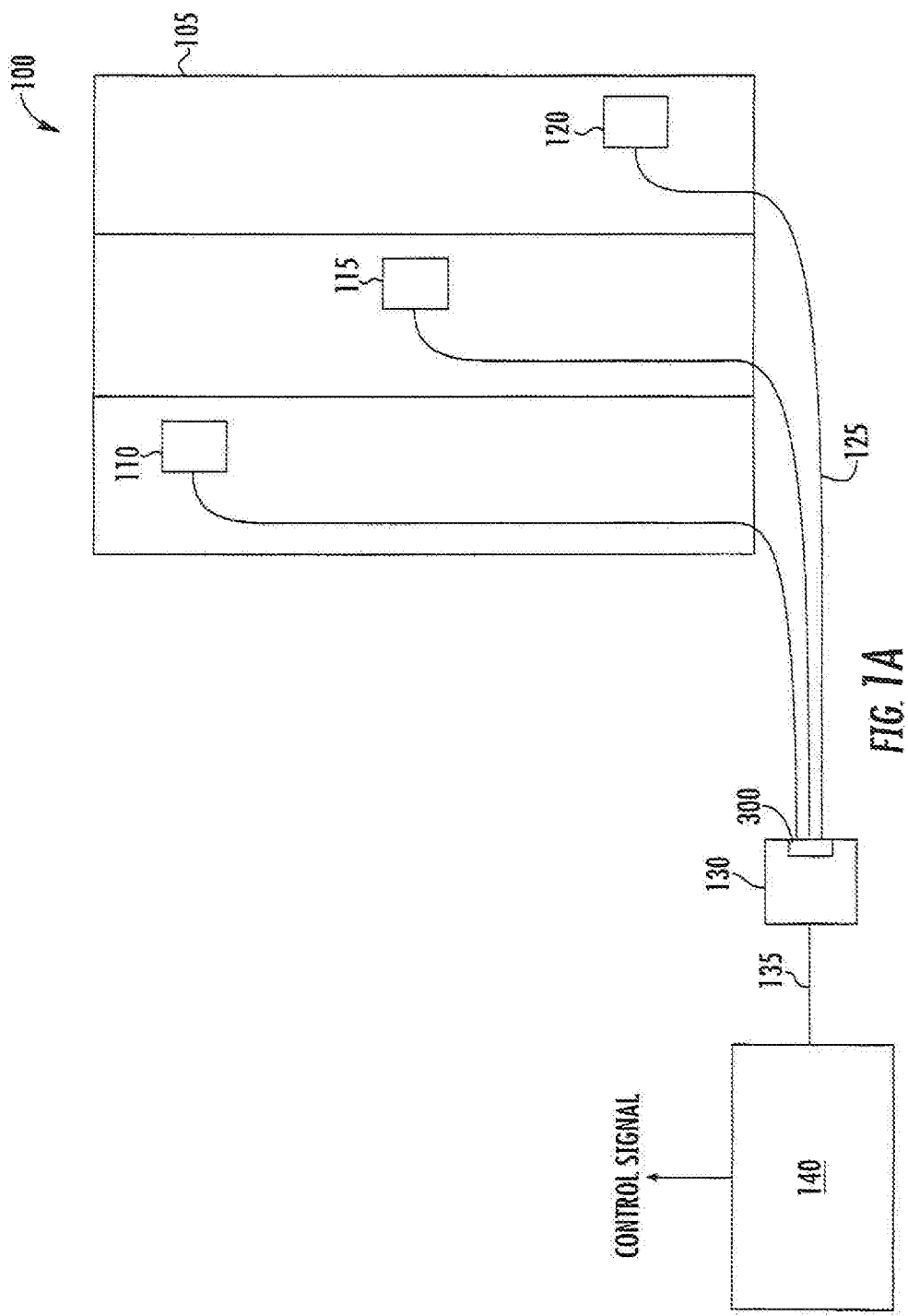
FIG. 1A is a schematic representation of a remote monitoring system utilizing infrared cables to conduct infrared light from monitored locations to an infrared camera that is remote from the monitored locations in some embodiments according to the invention.

Embodiments of the present disclosure are described herein with reference to the accompanying drawings. Other embodiments may take many different forms and should not be construed as limited to the embodiments set forth herein. Like numbers refer to like elements throughout.

As appreciated by the present inventor, some electrical equipment can be prone to overheating which can indicate a likelihood of an impending failure or other defects that can affect the reliability of electrical equipment. In some of these situations, the electrical equipment can be contained within an enclosure which may be otherwise difficult to access for the purposes of measuring the temperature of that electrical equipment. For example, in a switchgear enclosure, three phase breakers may be provided as a way to isolate upstream and/or downstream power distribution. In operation, the three phase circuit breakers may be prone to overheating if, for example, a poor connection is made to a contact of the three phase breakers. This poor contact may be evidenced by a "hotspot" where the temperature at the contact is greater than what would otherwise be expected in normal operation. Accordingly, monitoring the temperature of such locations (e.g., three phase breaker contacts) can be advantageous in detecting potential failures associated with the switchgear.

The assembly of equipment inside the switchgear, however, may make it difficult to monitor each of the locations conveniently using, for example, a single infrared camera. In other words, because of the density or layout of equipment within the switchgear it may be difficult to monitor the temperature of all the locations that are prone to heating using a single infrared camera located inside the enclosure. For example, some three phase breakers may be located deep within the central portion of the switchgear enclosure and may therefore be difficult to observe using an infrared camera. Moreover, it may be difficult to position one or more cameras to observe all of the locations that are to be monitored.

Accordingly, as appreciated by the present inventor, infrared cables can be located proximate to each of the locations to be monitored. The infrared cables can be configured to conduct infrared light from the monitored locations to an infrared camera that is located outside, for example, the enclosure. In operation, the infrared light from each of the monitored locations enters the infrared cable and is conducted along the infrared cable to an infrared camera that can be located outside the enclosure. Accordingly, the infrared cables can be used to monitor locations which would otherwise be difficult to image using an infrared camera due to other pieces of equipment that may obscure the view of the monitored locations relative to the infrared camera inside the enclosure. It will be understood that "infrared light" as used herein includes any electromagnetic radiation that starts from the nominal edge of visible light at a wavelength of about 0.7 micrometers and extending up to about 1 millimeter.

In contrast, in some embodiments according to the invention, the infrared cables can be placed anywhere inside the enclosure in order to access the monitored locations, including penetrating through interior housings, around components, etc. In other words, the infrared cables can be dressed in any way inside the enclosure so long as the infrared cable is configured to conduct the infrared light from the monitored locations to the infrared camera. For example, some locations to be monitored may be relatively close to the infrared camera whereas other locations to be monitored are relatively remote, however, the remote location may utilize a shorter length of infrared cable compared to the relatively proximate location to be monitored due to the fact that the infrared cable used to monitor the proximate location is coiled or dressed within the enclosure to accommodate the particular topology inside the enclosure associated with the proximate location to be monitored.

The plurality of infrared cables from the different monitored location can be provided to, for example, an IR sensor array of a single infrared camera. In particular, the plurality of infrared cables can be bundled together and presented directly to the infrared sensor array in any arrangement that is convenient for the routing of the individual infrared cables to/from the enclosure. In other words, the correspondence between the infrared cables and the particular portions of the infrared array to which those infrared cables are mapped can be irrelevant to the physical locations of the equipment being monitored inside the enclosure. Still further, the infrared camera can provide data to a processor circuit that presents temperature data associated with each of the monitored locations so that a user may monitor the temperature associated with those locations in order to determine potential overheating and reliability issues associated with the equipment.

It will be understood that although some embodiments according to the invention can relate to monitoring equipment inside a switchgear including, for example, circuit breakers, other embodiments according to the invention are not limited to those including an enclosure or systems including a switchgear or to electrical equipment. To the contrary, embodiments according to the invention can be utilized in any arrangement where the locations to be monitored are not within a line of sight of one another when using optical means to monitor those locations (such as a camera). For example, in some embodiments according to the invention, the locations to be monitored may be located within a room along with the infrared camera to which the infrared cables are routed. In still further embodiments according to the invention, the locations to be monitored can be located within an otherwise difficult to access space such as inside a satellite, a well, inside a robot, in a dangerous environment (such as in locations associated with high levels of radiation), underwater, etc. Other environments may also be serviced using embodiments according to the invention.

FIG. 1A is schematic representation of a remote monitoring system 100 utilizing a plurality of infrared cables 125 to conduct infrared light associated with a plurality of monitored locations 110, 115, 120 to an infrared camera 130 that is remote from the monitored locations in some embodiments according to the invention. According to FIG. 1A, the monitored locations 110, 115, and 120 are located within an enclosure 105 that could be used to enclose a switchgear where the monitored locations 110, 115, and 120, represent, for example, three phase circuit breakers having connections made thereto which may be subject to overheating due to the quality of connections made at the contacts thereof. It will be understood that the IR camera can be any sensor that is configured to detect IR light that exists the infrared cable 125, such as a "dumb" IR camera or a "smart" IR camera such as a FUR AX8 Thermal Monitoring System available from FLIR in Wilsonville, Oreg.

As further shown in FIG. 1A, each of the plurality of infrared cables 125 passes through the enclosure 105 to optically couple to an infrared sensor array 300 of the infrared camera 130. In operation, the infrared light generated by the monitored locations 110, 115, and 120 enters the respective infrared cable 125 and is conducted therein from the monitored locations to the remote end of the infrared cable 125 whereupon the infrared light exits the infrared cable 125 and impinges on the infrared sensor array 300 for detection by the infrared camera 130. The infrared camera 130 can then provide data associated with the infrared light received via the infrared image array 300 to a processor circuit 140 which can display temperature information associated with each of the monitored locations 110, 115, and 120 so that the user of the processor circuit 140 may monitor the temperature of the equipment within the enclosure 105 and may more readily identify potential reliability problems.

According to FIG. 1B, the infrared cable 125 includes an outer cladding layer that surrounds an interior portion of the infrared cable 125. The infrared cable 125 includes a first opening 122 which the infrared light 127 can enter the infrared cable 125 for transmission to a second opening at the remote end of the cable 125 where the infrared light 127 exits the infrared cable 125. Accordingly, when the infrared cable 125 is placed proximate to one of the monitored locations 110, 115, and 120, infrared light generated by heat associated with the monitored locations enters the infrared cable at the first opening 122 and is conducted along the infrared cable 125 to an exit at the remote end of the infrared cable 125 whereupon the infrared light exits the infrared cable 125 and is impinged on the infrared sensor array 300.

It will be understood that the infrared cable 125 can be any optical cable that is configured to conduct infrared radiation or light from the first opening to the second opening without attenuation that would otherwise prevent accurate detection by the IR camera 130. It will be further understood that in some embodiments according to the invention, the infrared cable 125 can be a glass fiber cable, a tellurite glass fiber cable, a CHG fiber, a hollow-core infrared cable, a solid-core infrared cable, a crystal-core infrared cable, a soft glass infrared cable, or a hybrid infrared cable. Other types of infrared cable may also be utilized. Other types of infrared cables are also described in, for example, "Infrared Fibers" by Tao et al published in Advanced in Optics and Photonics 7, 379-458 (2015), the entire content of which is hereby incorporated herein by reference.

FIGS. 1B and 1C are schematic views of the infrared cable 125 configured to conduct infrared light from the monitored locations 110, 115, and 120 to the remote infrared camera 130 in some embodiments according to the invention. According to FIG. 1A, each of the monitored locations 110, 115, and 120 is located within the enclosure 105 such that a line of sight between at least two of the monitored locations is optically blocked. For example, in the arrangement shown in FIG. 1A, at least one of the monitored locations 110, 115, and 120 may not be visible from the position of the other monitored locations. For example, if a camera were placed inside the enclosure 105 so that the location 110 could be monitored, at least monitored location 115 or monitored location 120 would not be visible in the image produced by the camera positioned to monitor location 110. For example, the interior partitions in the enclosure 105 shown between each of the monitored locations 110, 115, and 120 may represents a physical partition such that a line of sight between the monitored locations is blocked by the partitions. In other words, the partitions within the enclosure 105 prevent the observation of more than one of the monitored locations from a single location within the enclosure 105.

Figure 2:
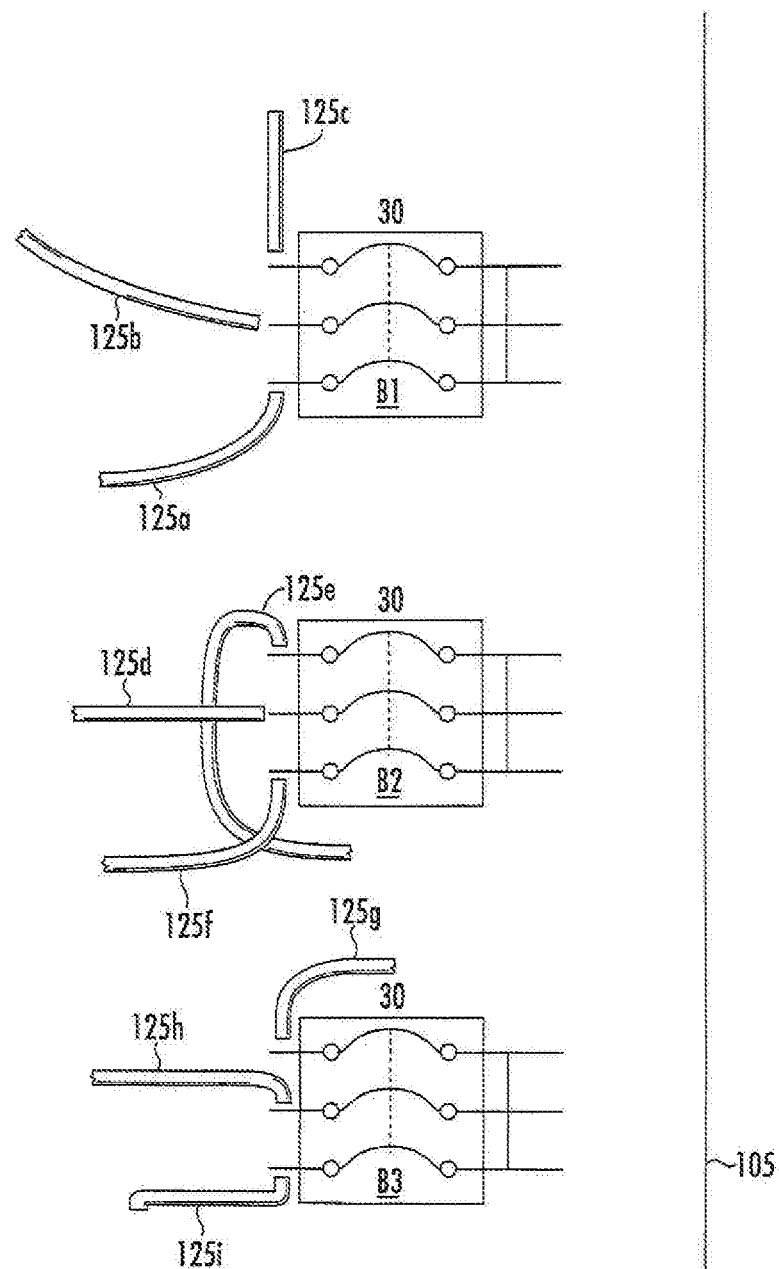
FIG. 2 is a schematic representation of 3-phase breakers and respective infrared cables associated with respective contacts of the 3-phase breakers in some embodiments according to the invention.

FIG. 2 is a schematic representation of the interior of the enclosure 105 including three phase circuit breakers 30 as the plurality of monitored locations shown in FIG. 1A where each of the three phase breakers includes respective contacts which may be subject to overheating in some embodiments according to the invention. Referring to FIGS. 1A and 2, each of the contacts on the three phase circuit breakers 30 has a respected infrared cable 125 associated therewith. Accordingly, infrared light then associated with the generation of heat at the associated contact of the three phase breaker 30 can enter the respective infrared cable 125 and can be conducted therein to a remote opening in the infrared cable that is proximate to the infrared camera 130 shown in FIG. 1A. It will be understood that as shown in FIG. 2, the three phase breakers 30 are each not within the line of sight of one another. Accordingly, the three phase circuit breakers are shown proximate to one another for convenience and it will be understood that the three phase circuit breakers are positioned within the enclosure so that they are not all observable from a single location within the enclosure 105.

Referring still to FIG. 2, the plurality of infrared cables 125 can be routed inside the enclosure using any pathway that is convenient for the assembly. In other words, the infrared cables 125 can be looped, coiled, snaked, bundled, etc., in any way that is convenient to route the infrared cable from the monitored location, outside the enclosure 105 to the infrared camera 130. For example, infrared cables 125A-C are associated with respective contacts of the three phase circuit breaker 30 labeled B1. Accordingly, infrared light generated by heat at the respective contact of the three phase breaker B1 is optically coupled to the respective infrared cable 125A-C which is then conducted to the infrared camera 130 through the infrared cable 125A-C. Still further, the breaker B2 can have a set of infrared cables 125E-F also associated with respective contacts thereof for conducting associated infrared light generated by heat at the contacts to the infrared camera outside the enclosure 105. Still further, a third set of infrared cables 125G-I are also associated with respective contacts of the breaker B3 which are used to monitor heat thereat using the infrared light that is conducted through the infrared cables 125G-I to the infrared camera 130. Although FIG. 2 illustrates a respective infrared cable 125 associated with each of the contacts of the breaker B1-B3, other arrangements may be used. For example, in some embodiments according to the invention, only certain ones of the contacts may be configured for monitoring. Other contacts, however, may not be monitored for temperature based on, for example, a determination that those contacts are less subject to heating than other contacts.

Figure 3A:
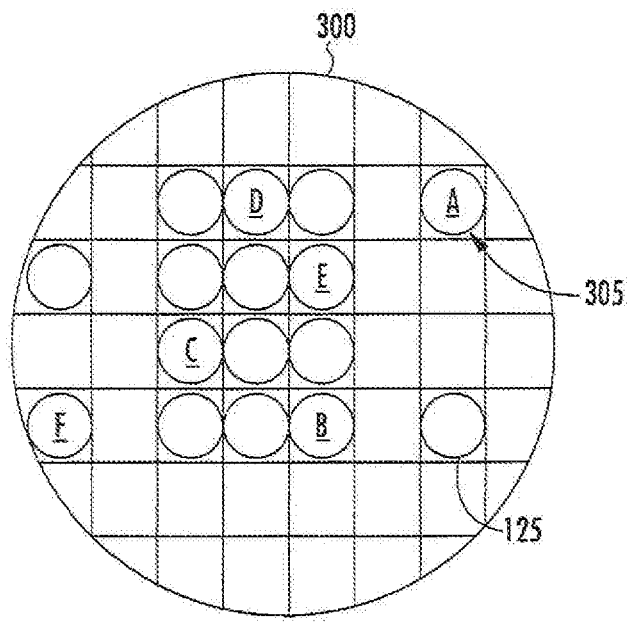
FIG. 3A is a schematic representation of an infrared sensor array included in the infrared camera and configured to optical couple to a plurality of infrared cables in some embodiments according to the invention.
Figure 3B:
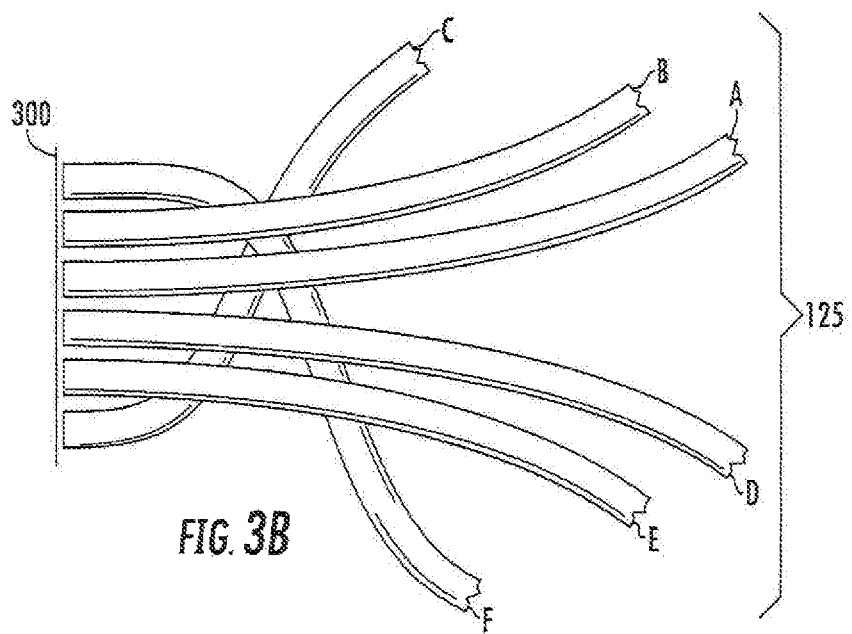
FIG. 3B is a schematic representation of an arrangement of a plurality of infrared cables configured to conduct infrared light from the remote locations to respective sub-arrays of the infrared camera in some embodiments according to the invention.

FIG. 3A is a schematic representation of the infrared sensor array 300 within the infrared camera 130 which is configured to optically couple to the infrared cables 125 associated with the locations to be monitored 110, 115, and 120 in some embodiments according to the invention. FIG. 3B is a schematic representation of an arrangement of the infrared cables 125 each having an association with a respective subarray 305 of the infrared sensor array 300 shown in FIG. 3A in some embodiments according to the invention.

According to FIG. 3A, the infrared array 300 includes a plurality of subarrays 305 each of which can include a number of pixels. For example, in some embodiments, each subarray 305 may be a 10×10 array of pixels. As further shown in FIG. 3A, each of the subarrays 305 is predetermined to have an association with a particular infrared cable which is in turn associated with a predetermined one of the locations to be monitored. For example, in some embodiments according to the invention, subarray A shown in FIG. 3A can be predetermined to be associated with the infrared cable A shown in FIG. 3B which is routed to the monitored location 110. Still further, subarray E can be predetermined to be associated with infrared cable E shown in FIG. 3B which is routed to monitored location 115 within the enclosure 105. Subarray F within the array 300 can have a predetermined association with infrared cable F shown in FIG. 3B which is routed to proximate to monitored location 120 inside the enclosure 105.

It will be further understood that each of the cables described above can correspond to one of the cables 125 shown in FIG. 2. For example, each of the cables 125 shown in FIG. 3B can be associated with a particular contact of one of the three phase breakers B1-B3 and therefore can conduct infrared light associated with one of the contacts which is conducted to a particular subarray 305 within the array 300.

According to FIG. 3B, the plurality of cables 125 are spaced apart from a surface of the array 300 but remain optically coupled thereto so that the infrared light from each of the infrared cables can exit the respective cable and impinge on the predetermined subarray 305 with which that infrared cable is associated without substantial attenuation. Accordingly, infrared light that exits infrared cable C shown in FIG. 3B exits the second end of the cable which is spaced apart from the array 300, translates through an open space, and impinges on, for example, subarray B shown in FIG. 3A. In operation, the infrared camera 130 can detect the infrared light present at the particular subarray 305 which can be transmitted to the processor circuit 140 shown in FIG. 1A. In some embodiments according to the invention, the infrared cables shown in FIG. 3B can be spaced apart from the array 300. In some embodiments, the infrared cables can contact the array 300 or be separated by a filtering material or hermetically sealed with the IR sensor.

It will be understood that each of the subarrays 305 shown in the array 300 can be subject to a window such that the camera 130 or processor circuit 140 can provide minimum and maximum temperature data for the infrared light that is received by that particular subarray 305. For example, in some embodiments the camera 130 can be configured to provide minimum and maximum temperature data for a particular subarray or plurality of subarrays 305 within the array 300. For example, in some embodiment according to the invention, the camera 130 can be configured to provide minimum, maximum, average, or raw value temperature data for the plurality of subarrays 305 that include cables B, C, D, and E. In such operations, the camera 130 can sample the infrared light provided to each of the subarrays 305 within the defined window and provide the minimum, maximum, averaged, or sensor's raw temperature detected for all infrared light received via cables B, C, D, and E (i.e., with the defined window). Accordingly, the window defined by the infrared camera 130 can provide the minimum and maximum temperature detected across each of the monitored locations associated with cables B, C, E, and D. Further, it will be understood that each of those monitored locations to which the respective infrared cable is routed can be in different parts of the enclosure 105 shown in FIG. 1A.

FIGS. 4A-D are schematic representations of displays 400 showing temperature information associated with respective breaker contacts B1-B3 with respective windows W drawn around different breakers for presentation of calculated minimum, calculated maximum, or sensor's raw temperature data in some embodiments according to the invention. According to FIG. 4A, the display 400 is provided with graphical representations of the breakers B1-B3 which are physically located within the enclosure 105 shown in FIG. 1A. Accordingly, breaker B1 may represent monitored location 110 shown in FIG. 1A whereas breaker B2 may represent monitored location 115 and finally breaker B3 may represent monitored location 120. In some embodiments, the processor circuit 140 can be configured to provide the graphical display 400 including the representations of the breakers B1-B3 for the convenience of the operator who may monitor the temperatures associated with the locations 110, 115, and 120 to detect reliability issues associated with the equipment 100.

Figure 4A:
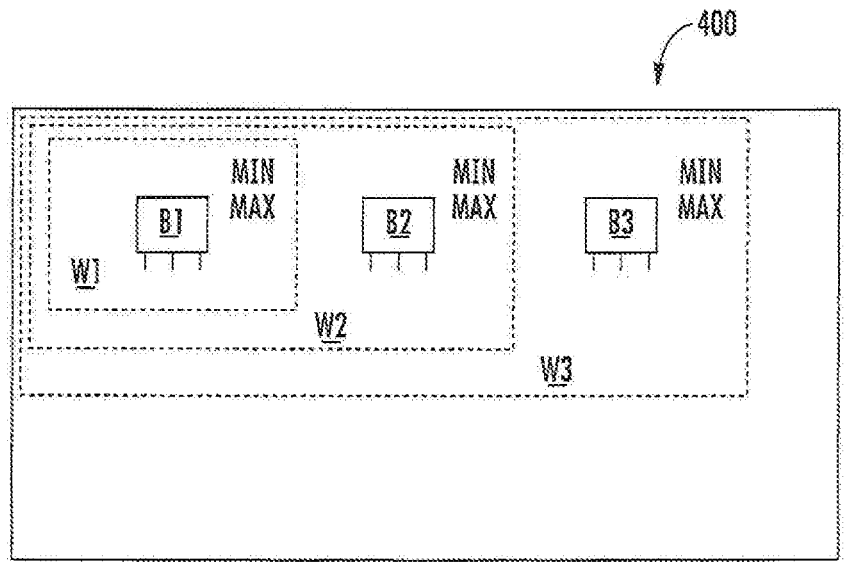
FIGS. 4A-D are schematic representations of displays showing temperature information associated with respective breaker contacts with windows W drawn around different breakers for presentation of minimum and maximum temperatures in the windows in some embodiments according to the invention.
Figure 4B:
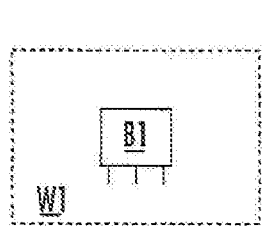
Figure 4C:
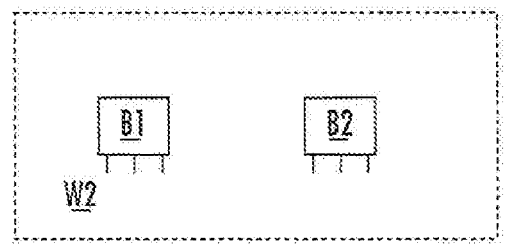
Figure 4D:
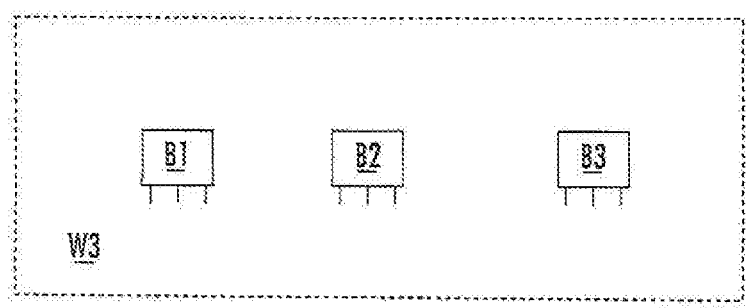

According to FIG. 4A, the windows W1, W2, and W3 may be provided by the infrared camera 130 or by operations of the processor circuit 140. The window W1 drawn around breaker B1 would provide minimum and maximum temperature data associated with the infrared light provided via the infrared cables positioned to monitor the temperature associated with any or all of the contacts of B1. For example, as shown in FIG. 2, the breaker B1 may have three infrared cables associated therewith wherein each of the infrared cables is associated with a particular one of the contacts of breaker B1. Accordingly, the window W1 may present minimum and maximum temperature data associated with the infrared light provided by the infrared cables associated with the contacts in breaker B1 as shown in FIG. 4B. Still further according to FIG. 4A and FIG. 4C, the window W2 is drawn to surround both breakers B1 and B2 such that minimum and maximum temperature data associated with infrared light generated by the contacts associated with B1 and B2 can be presented therein. For example, as shown in FIG. 2, each of the contacts of breakers B1 and B2 can have a respective infrared cable 125 associated therewith which is then routed to a particular subarray within the array 300. The window W2 can select the minimum and maximum temperature observed across the six different contacts of breakers B1 and B2 represented by the infrared light provided by each of the infrared cables 125 associated with those contacts as shown in FIG. 4C. Still further, in FIG. 4D, a window W3 is shown drawn around breakers B1-B3 each of which has a respective infrared cable associated with each of the contacts thereof in some embodiments according to the invention. Accordingly, the camera 130 or the processor circuit 140 can generate minimum and maximum temperature data for display as shown in FIG. 4D.

It will be further understood that windows W1-W3 can be dynamically assigned such that the user may change which of the locations are monitored by the processor circuit 140. For example, in some embodiments according to the invention, the operator may modify the window W2 to include breakers B2 and B3 rather than B1 and B2. In operation, for example, the operator may draw a window around all of the breakers B1-B3 whereupon a minimum and maximum temperature is provided across each of the monitored contacts. If the difference between the minimum and maximum appears to be out of specification, the operator may redefine the window to include fewer breakers until a particular contact on a particular one of the breakers can be identified as the potential hotspot among breakers B1-B3.

Figure 5:
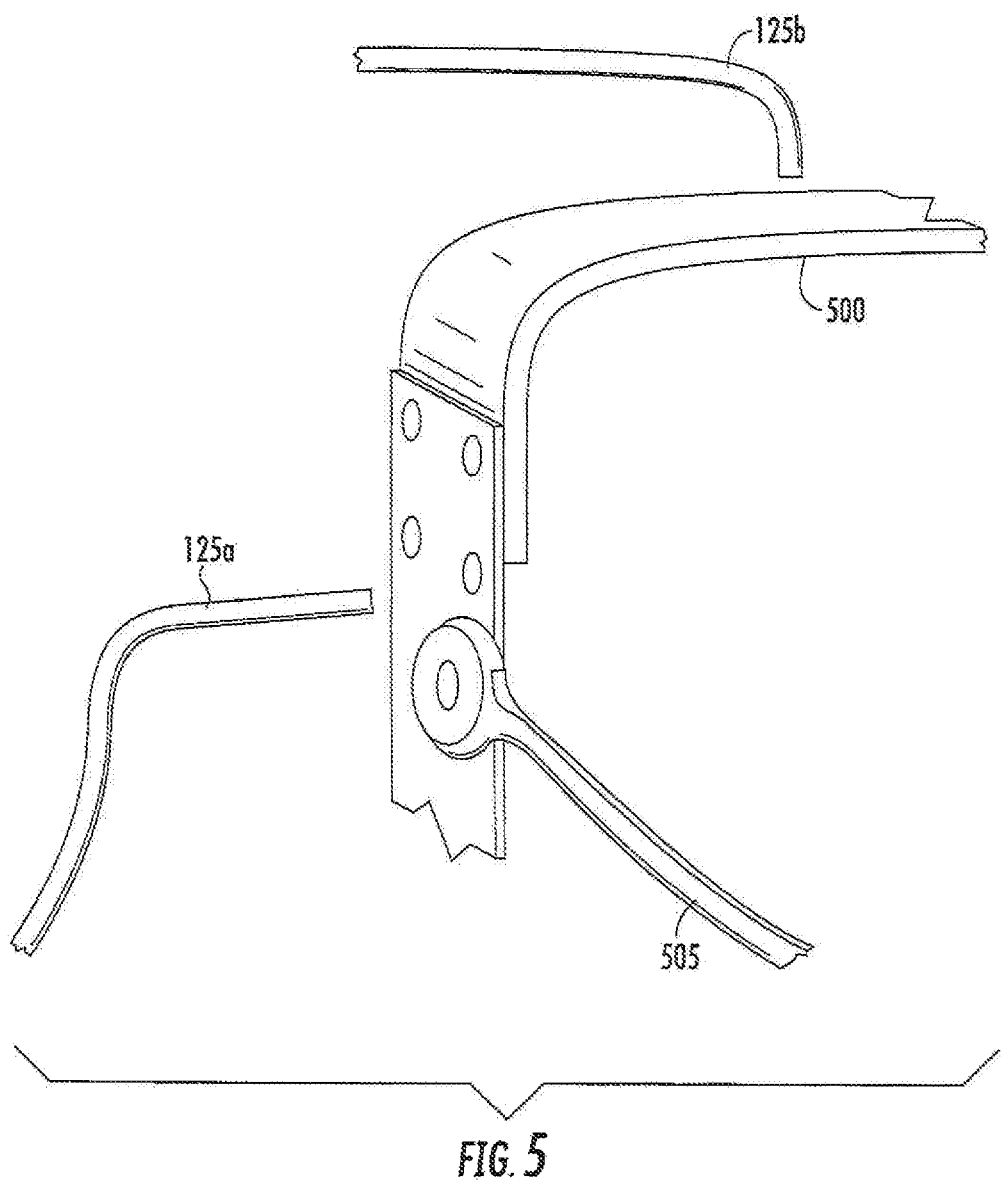
FIG. 5 is a schematic representation of a bus bar and infrared cables positioned to monitor a location prone to heating and associated with a remote location for an ambient temperature in some embodiments according to the invention.

FIG. 5 is a schematic representation of a bus bar 500 and infrared cables 125A and 125B position to monitor a location prone to heating and a remote location for delta temperature comparison in some embodiments according to the invention. According to FIG. 5, a cable 505 is routed to a bus bar contact on the bus bar 500 for provisioning of power to/from the bus bar 500. As further shown in FIG. 5, an infrared cable 125A is positioned proximate to the bus bar contact based upon the assumption that the bus bar contact may be subject to heating due to the quality of the connection to the bus bar 500. As further shown in FIG. 5, an infrared cable 125B is located remote from the bus bar contact to provide an indication of nominal temperature rise relative to the bus bar contact. This nominal temperature rise of the buss bar is used to offset temperate rise that naturally occurs due to increased load. This remote temperature reading is used in temperate comparison of delta calculation.

Figure 6:
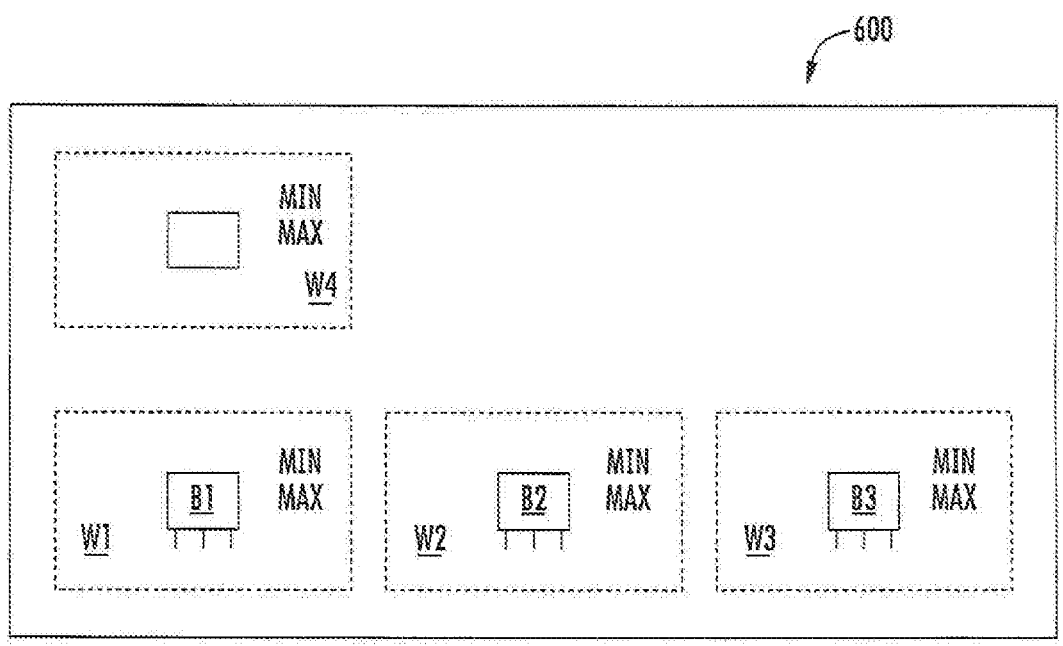
FIG. 6 is a schematic representation of a display including a plurality of windows associated with respective monitored locations including a window W4 associated with both monitored locations shown in FIG. 5 in some embodiments according to the invention.

Each of the infrared cables 125A-B is routed to the array 300 of the camera 130 which in turn provides data to the processor circuit 140 for display to the user as shown in FIG. 6. FIG. 6 is a schematic representation of the display including the plurality of windows associated with respective monitored locations including window W4 associated with both monitor locations shown in FIG. 5 in some embodiments according to the invention.

According to FIG. 6, the window W4 is shown drawn around the ambient location associated with infrared cable 125B as well as around the hotspot location 125A. The processor circuit 140, for example, may present the user with minimum, maximum, or averaged observed temperature between the remote buss bar temperature location and the hotspot location (delta temperature rise). Accordingly, if the difference between the remote buss bar temperature and the hotspot location is out of spec, the user may determine that the bus bar contact may be improper and therefore may lead to reliability problems.

Figure 7:
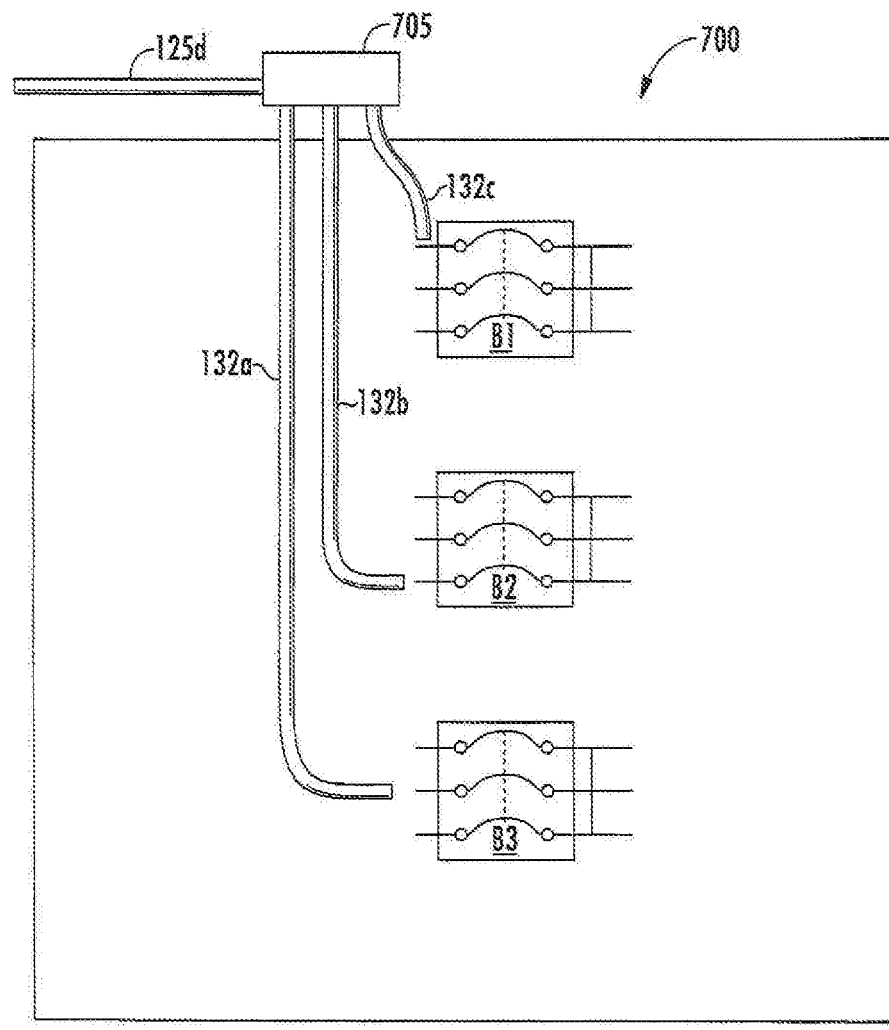
FIG. 7 is a schematic representation of a plurality of 3-phase breakers being the monitored locations and each having a respective infrared cable associated with at least one contact thereof and provided to an infrared cable switch remotely controlled by the processor circuit to select among infrared light associated with each of the monitored locations in some embodiments according to the invention.

FIG. 7 is a schematic representation of a plurality of three phrase breakers B1-B3 being the monitored locations and each having respective infrared cable 125A-C associated with at least one contact of the breakers B1-B3 in some embodiments according to the invention. As further shown in FIG. 7, each of the infrared cables 125A-C is provided to an infrared cable switch 705 which is then optically coupled to a fourth infrared cable 125D and is routed to the array 300 of the camera 130.

According to FIG. 7, the infrared cable switch 705 may operate under the control of the processor circuit 140 to switch optically couple the infrared light conducted by each of the infrared cables 125A-C to the infrared cable 125D. For example, in operation the processor circuit 140 may control the infrared cable switch 705 to select infrared cable 125A, then 125B, then 125C to sequentially optically couple the infrared light associated with the middle contact of breaker B3 to the infrared cable 125D followed by the infrared light associated with the lowermost contact of breaker B2 to the infrared cable 125D and finally optically couple the infrared light generated by the uppermost contact of breaker B1 from the infrared cable 125C to the infrared cable 125D.

According to this operation, each portion of the infrared light associated with one of the monitored contacts can be multiplexed onto a single infrared cable 125D. Accordingly, in some embodiments according to the invention, less infrared cabling may be used to cover a relatively large number of monitored locations. For example, in the arrangement shown in FIG. 1A adapted to the embodiment shown in FIG. 17 may reduce the amount of infrared cabling used to conduct the infrared light to the camera 130. Still further, the processor circuit 140 may operate the camera 130 to sequentially provide the temperature data associated with each portion of the infrared light serially from the camera to the processor circuit so that the amount of infrared light associated with each of the contacts can be separated from one another.

Figure 8:
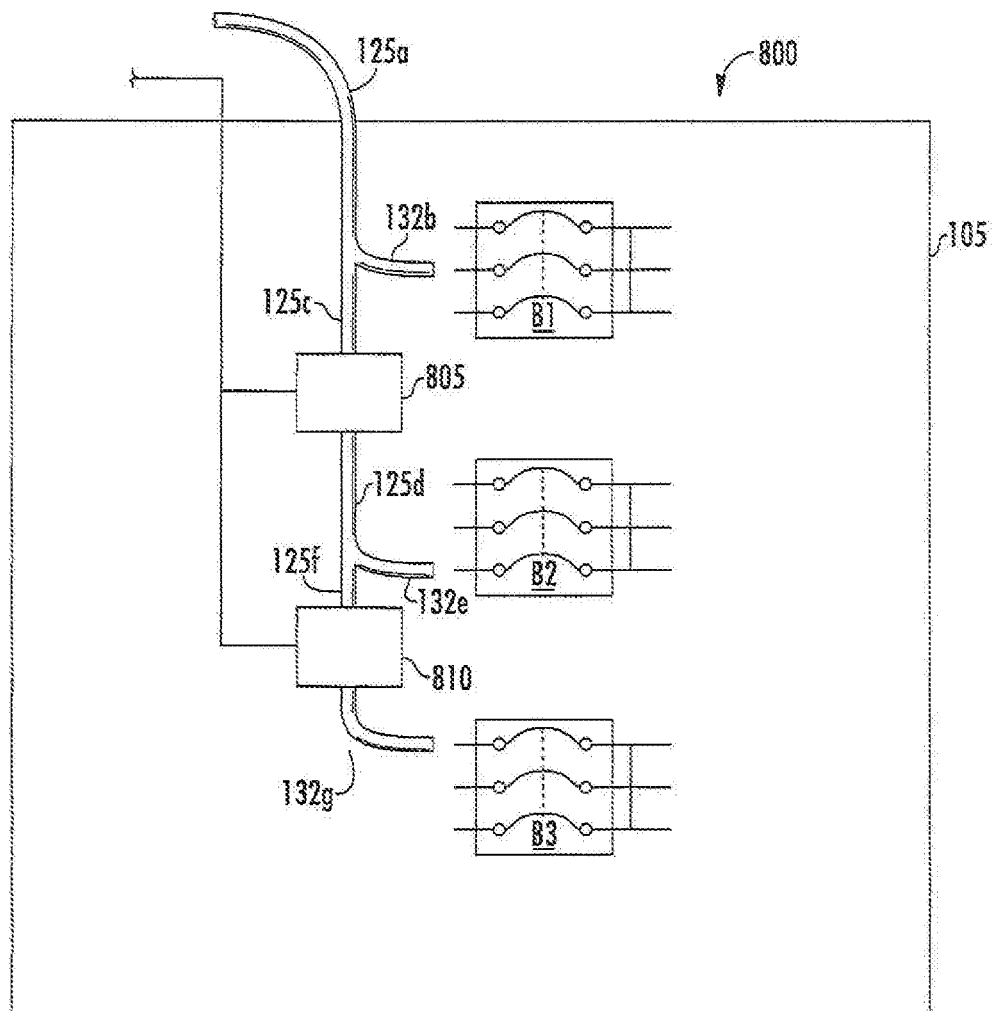
FIG. 8 is a schematic representation of a plurality of 3-phase breakers being the monitored locations and a respective infrared cable stub associated with a particular contact of each of the 3-phase breakers isolated from one another by an infrared cable switch remotely controlled by the processor circuit in some embodiments according to the invention.

FIG. 8 is a schematic representation of a plurality of three phase breakers being the monitored locations and respective infrared cable stubs 125B, E, and G that are associated with at least one of the contacts of the breakers B1-B3. It will be understood that the infrared cable stubs shown in FIG. 8 are spliced into the respective main infrared cable 125A and 125F to so insubstantial attenuation of the infrared light occurs between where the infrared light enters the stub to where the infrared light is provided to the main infrared cable. For example, the infrared cable stub 125E is spliced into the main infrared cable 125D. Still further, the infrared cable stub 125B is spliced into the main infrared cable 125C.

As further shown in FIG. 8, infrared cable switches 805 are located along the main infrared cable 125A so as to separate infrared light generated by the respective contact. For example, the processor circuit 140 can sample the infrared light generated by the center contact of the breaker B1 by switching the infrared cable switches 805 and 810 off so that the only infrared light conducted by the infrared cable 125A is that associated with the middle contact of breaker B1. Still further, processor circuit 140 can enable the infrared cable switch 805 to also conduct the infrared light associated with the lowermost contact of breaker B2 onto the main infrared cable 125A which is then additively combined with the infrared light generated by the middle contact of the breaker B1.

The processor circuit 140 may receive both infrared data separately and may determine the infrared light associated with the lowermost contact of B2 by subtracting the first infrared data from the second infrared data which represents the addition of the infrared data from the middle contact of breaker B with the infrared data associated with the lowermost contact of breaker B2. Still further, the processor circuit 140 can enable the optical cable switch 810 to add the infrared light associated with the uppermost contact of the breaker B3 to the infrared light associated with the contacts of breakers B1 and B2. The processor circuit 140 may then use this additional data to determine the temperature associated with the uppermost contact of the breaker B3. As further shown in FIG. 8, the stubs 125B and 125E are spliced into the main infrared cable 125 to reduce the amount of infrared cabling needed to convey infrared light to the camera 130.

Figure 9:
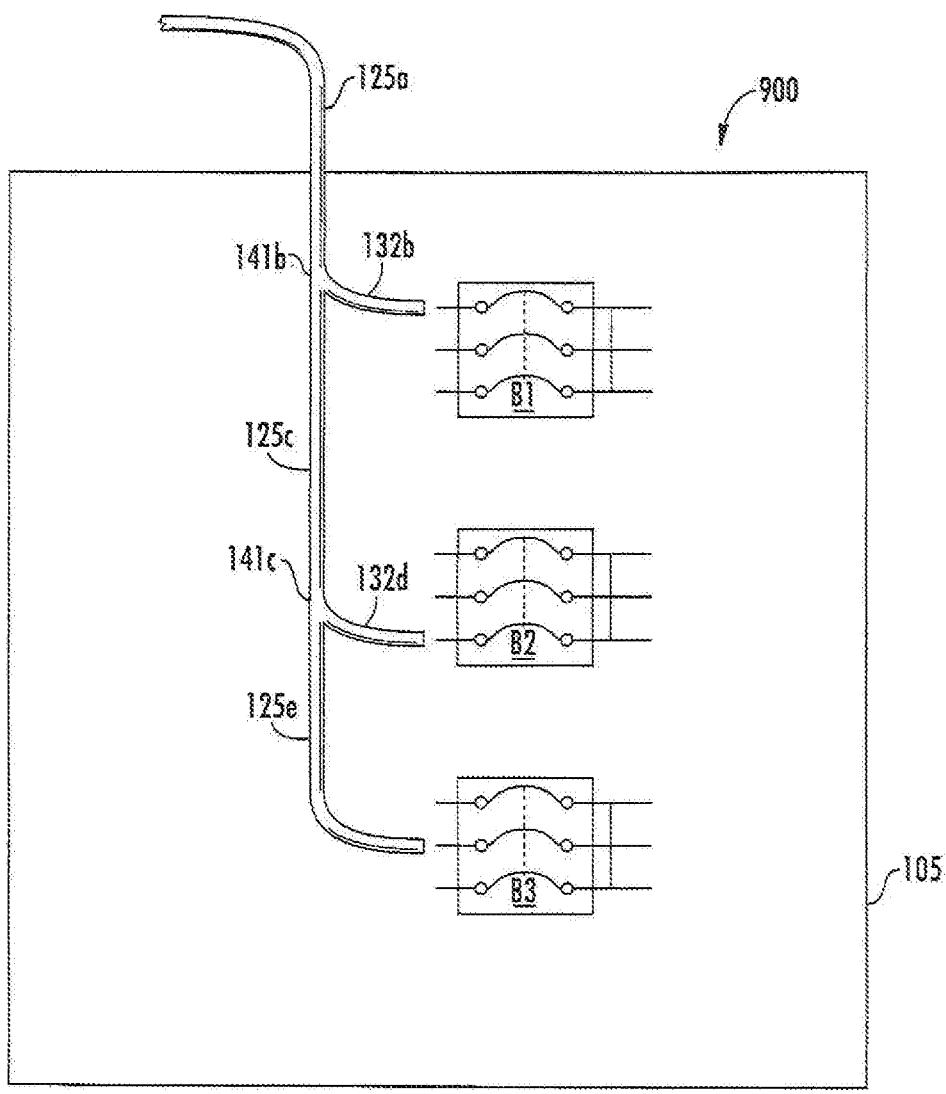
FIG. 9 is a schematic representation of a plurality of 3 phase breakers being the monitored locations and each having an associated infrared cable stub associated with a particular one of the contacts of the 3-phase breakers combined together onto an infrared cable in some embodiments according to the invention.

FIG. 9 is a schematic representation of a plurality of three phase breakers being the monitored locations shown in FIG. 1A and each having an associated infrared cable stub associated with one of the contacts of the breakers B1-B3. In operation, the infrared light generated by the uppermost contact of the breaker B1 is added to the infrared light generated by the lowermost contact of the breaker B2 which is also added to the infrared light generated by the middle contact of the breaker B3. These three infrared light components are combined onto the infrared cable 125A which is then conducted to the infrared camera 130 whereupon the processor circuit 140 can determine the temperature associated with the combination of the uppermost contact of the breaker B1, the lowermost contact of the breaker B2, and the middle contact of the breaker B3. In operation, the processor circuit 140 may use the combined infrared data as a general indication of the conditions associated with breakers B1-B3. Still further, the stubs 125B and 125D may further reduce the amount of infrared cabling needed to couple the monitored locations to the infrared camera 130 without the need for separate infrared cable switches as described herein.

Figure 10:
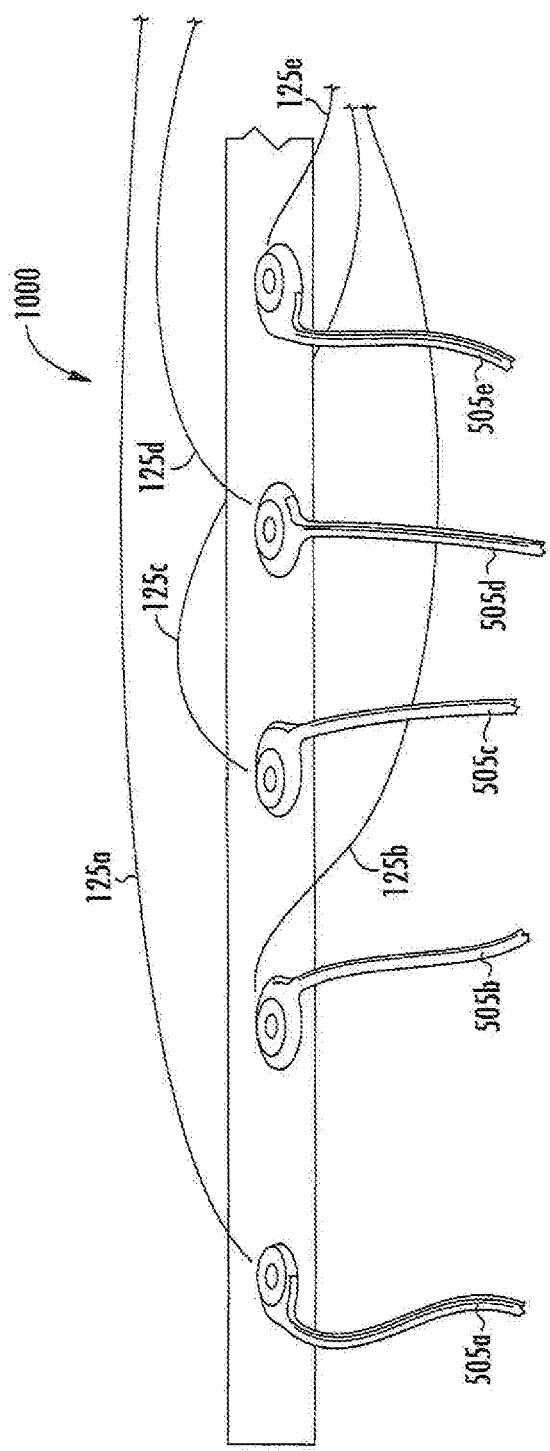
FIG. 10 is a schematic representation of a bus bar having a plurality of bus bar contacts being the monitored locations and each having an associated infrared cable associated therewith for remote monitoring of the temperature of the bus bar contacts in some embodiments according to the invention.

FIG. 10 is a schematic representation of a bus bar 1000 having a plurality of bus bar contacts being the monitored locations each having an associated infrared cable 125 associated therewith for remote monitoring of the temperature of the bus bar contacts in some embodiment according to the invention. It will be understood that FIG. 10 illustrates that the bus bar 1000 is not located within an enclosure such as that shown in FIG. 1A. To the contrary, FIG. 10 may illustrate that the bus bar 1000 is located within for example a server room or other large space wherein the bus bar contacts are used to tap into the bus bar 1000 at a variety of locations such as where servers may connect to the bus bar 1000 for power. As further shown in FIG. 10, each of the bus bar contacts has an associated infrared cable 125A-125E associated therewith which is configured to conduct infrared light generated by the respective bus bar contact to the infrared camera 130 which may be located within the same room but may be optically out of the line of sight to at least one of the bus bar contacts shown in FIG. 10. In other words, the infrared camera may be located at least some of the bus bar contacts are not visible from that single location in which the camera is placed. In operation, the infrared cables 125A-E are routed to the infrared camera 130 which provides the temperature data to the processor circuit 140 for provisioning to the user as described herein.

Figure 11:
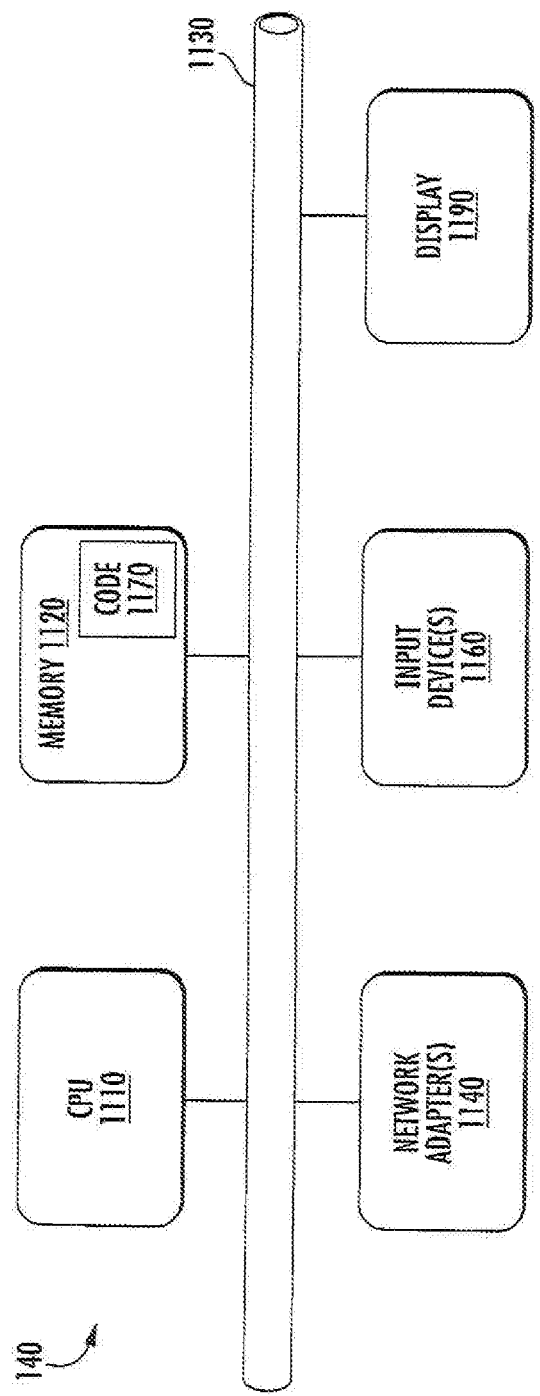
FIG. 11 is a block diagram of a processor circuit coupled to the infrared camera and configured to control operations described herein in some embodiments according to the invention.

FIG. 11 is a schematic of the processor circuit 140 coupled to the infrared camera 130 and configured to control operations described herein in some embodiments according to the invention. The processor circuit 140 may include one or more CPUs 1110 and memory 1120 coupled to an interconnect 1130. The interconnect 1130 may be an abstraction that represents any one or more separate physical buses, point to point connections, or both connected by appropriate bridges, adapters, or controllers. The interconnect 1130, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called "Firewire."

The CPU(s) 1110 may control the overall operations of the infrared camera 130 and the infrared cable switches 810. As described herein, the one or more CPU(s) 1110 may be configured to receive input provided from a user and execute operations. In certain embodiments, the CPU(s) 1110 accomplish this by executing software or firmware stored in memory 1120. The CPU(s) 1110 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 1120 is or includes the main memory of the processor circuit 140. The memory 1120 represents any form of random access memory (RAM), read-only memory (ROM), flash memory, or the like, or a combination of such devices. In use, the memory 1120 may contain code containing instructions according to the techniques disclosed herein.

Also connected to the CPU(s) 1110 through the interconnect 1130 are network adapter(s) 1140. The network adapter(s) 1140 may provide the processor circuit 140 with the ability to communicate with remote devices, including the a server that is configured to operate other remote monitoring systems as described herein, over a network and may include, for example, an Ethernet adapter, a Bluetooth adapter, etc. The network adapter(s) 1140 may also provide the processor circuit 140 with the ability to communicate with other computers.

The code stored in memory 1120 may be implemented as software and/or firmware to program the CPU(s) 1110 to carry out actions described above. In certain embodiments, such software or firmware may be initially provided to the processor circuit 140 by downloading it from a remote system (e.g., via network adapter 1140).

Also optionally connected to the CPU(s) 1110 through the interconnect 1130 are one or more mass storage devices 1150. The mass storage device 1150 may contain the code 1170 for loading into the memory 1120. The mass storage device 1150 may also contain a data repository for storing configuration information related to the operation of the processor circuit 140, such as control of a display 1190.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A remote monitoring system comprising:
a plurality of infrared cable stubs each have a respective opening, wherein the respective opening is positioned proximate to a respective one of a plurality of monitored locations, each respective infrared cable stub being configured to conduct a respective infrared light emitted from the respective one of the plurality of monitored locations;
a main infrared cable spliced to each of the plurality of infrared cable stubs to optically couple each respective infrared light from the plurality of infrared cable stubs to the main infrared cable, the main infrared cable configured to conduct the respective infrared light from each of the plurality of monitored locations to a location remote from the plurality of monitored locations; and
a plurality of infrared cable switches, wherein each of the plurality of infrared cable switches is coupled to a respective one of the plurality of infrared cable stubs and is configured to optically isolate infrared light from the respective one of the plurality of infrared cable stubs from the main infrared cable in a first state and is configured to optically couple the infrared light from the respective one of the plurality of infrared cable stubs to the main infrared cable in a second state.

2. The system of claim 1 further comprising:
a processor circuit coupled to the plurality of infrared cable switches, the processor circuit configured to place each of the plurality of infrared cable switches in the second state to optically combine the infrared light emitted from at least two of the plurality of monitored locations to provide combined infrared light to the infrared cable.

3. The system of claim 1 further comprising:
an infrared camera including an infrared sensor array optically coupled to the main infrared cable.

4. The system of claim 3 further comprising:
an enclosure optically blocking a line of sight between the plurality of monitored locations and the infrared sensor array.

5. The system of claim 4 wherein the main infrared cable passes through an opening in the enclosure.

6. The system of claim 4 wherein the enclosure encloses a switchgear.

7. The system of claim 4 wherein the plurality of monitored locations inside the enclosure comprise a plurality of respective breaker contacts.

8. The system of claim 4 wherein the plurality of monitored locations inside the enclosure comprises a bus bar contact and a spot on a bus bar remote from the bus bar contact.

9. The system of claim 3 further comprising:
a processor circuit coupled to an output of the infrared sensor array, the processing circuit configured to receive respective data for each respective predetermined sub-array in the infrared sensor array; and
an electronic display coupled to the processor circuit, the electronic display configured to provide a representation of temperatures at the plurality of monitored locations inside a user defined window shown on the electronic display based on the respective data.

10. The system of claim 9 wherein the user defined window comprises a user redefinable window that is re-drawable by a user to provide a redrawn window to enclose a schematic representation of a selected one of the plurality of monitored locations and to exclude schematic representations of other ones of the plurality of monitored locations outside the redrawn window during operations of the system.

11. The system of claim 10 wherein temperatures of the selected one of the plurality of monitored locations includes a minimum temperature among the plurality of monitored locations enclosed by the redrawn window and a maximum temperature among the plurality of monitored locations enclosed by the redrawn window responsive to the plurality of monitored locations enclosed by the user redefinable window and to exclude temperatures of other ones of the plurality of monitored locations outside the redrawn window.

12. The system of claim 1 wherein the plurality of infrared cable stubs are spliced to the main infrared cable to form respective branches in the main infrared cable.

13. The system of claim 12 wherein the infrared light in the main infrared cable is combined with the infrared light in each of the plurality of infrared cable stubs are combined where the plurality of infrared cable stubs are spliced to the main infrared cable.

14. A remote monitoring system comprising:
a plurality of infrared cable stubs each have a respective opening, wherein the respective opening is positioned proximate to a respective one of a plurality of monitored locations, each respective infrared cable stub being configured to conduct infrared light emitted from the respective one of the plurality of monitored locations inside an enclosure; and
a main infrared cable optically spliced to each of the plurality of infrared cable stubs, the main infrared cable configured to conduct the infrared light from each of the plurality of monitored locations to a location remote from the plurality of monitored locations outside the enclosure.

15. The system of claim 14 further comprising:
an infrared cable switch optically coupled to the main infrared cable, the infrared cable switch configured to optically combine the infrared light emitted from at least two of the plurality of monitored locations to provide combined infrared light on the main infrared cable.

16. The system of claim 14 further comprising:
a plurality of infrared cable switches, wherein each of the plurality of infrared cable switches is coupled to a respective one of the plurality of infrared cable stubs and is configured to optically isolate infrared light from the respective one of the plurality of infrared cable stubs from the main infrared cable in a first state and is configured to optically couple the infrared light from the respective one of the plurality of infrared cable stubs to the main infrared cable in a second state.

17. The system of claim 16 further comprising:
a processor circuit coupled to the plurality of infrared cable switches, the processor circuit configured to place each of the plurality of infrared cable switches in the second state to optically combine the infrared light emitted from at least two of the plurality of monitored locations to provide combined infrared light to the main infrared cable.

18. The system of claim 14 further comprising:
an infrared camera including an infrared sensor array optically coupled to the main infrared cable outside the enclosure.

* * * * *

UNITED STATES PATENT AND TRADEMARK OFFICE
CERTIFICATE OF CORRECTION

Page 1 of 1

PATENT NO. : 11,073,425 B2
APPLICATION NO. : 16/739757
DATED : July 27, 2021
INVENTOR(S) : Pratik Patel It is certified that error appears in the above-identified patent and that said Letters Patent is hereby corrected as shown below:

On the Title Page

(73) Assignee: Please correct "Eaton Intelligent Power Limited" to read -- Eaton Intelligent Power Limited (IE) --

In the Specification

Column 4, Line 56: Please correct "FUR AX8" to read -- FLIR AX8 --

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*